(12) United States Patent
Tijink

(10) Patent No.: US 11,546,140 B2
(45) Date of Patent: Jan. 3, 2023

(54) METHOD FOR ENCRYPTED COMMUNICATION IN AN AD-HOC NETWORK

(71) Applicant: Kapsch TrafficCom AG, Vienna (AT)

(72) Inventor: Jasja Tijink, Breitenfurt (AT)

(73) Assignee: Kapsch TrafficCom AG, Vienna (AT)

( * ) Notice: Subject to any disclaimer, the term of this patent is extended or adjusted under 35 U.S.C. 154(b) by 275 days.

(21) Appl. No.: 16/903,046

(22) Filed: Jun. 16, 2020

(65) Prior Publication Data

US 2021/0006394 A1   Jan. 7, 2021

(30) Foreign Application Priority Data

Jul. 4, 2019 (EP) .................................. 19184401

(51) Int. Cl.

| H04L 9/08 | (2006.01) |
| H04W 4/46 | (2018.01) |
| B60W 40/105 | (2012.01) |
| G06K 9/62 | (2022.01) |
| H04L 67/12 | (2022.01) |
| H04W 84/18 | (2009.01) |

(52) U.S. Cl.
CPC ......... *H04L 9/0825* (2013.01); *B60W 40/105* (2013.01); *G06K 9/6215* (2013.01); *H04L 9/0827* (2013.01); *H04L 67/12* (2013.01); *H04W 4/46* (2018.02); *H04W 84/18* (2013.01); *B60W 2520/10* (2013.01); *H04L 2209/84* (2013.01)

(58) Field of Classification Search
CPC ..... H04L 9/0825; H04L 9/0827; H04L 67/12; H04L 2209/84; H04W 4/46; H04W 84/18; B60W 40/105; B60W 2520/10; G06K 9/6215
See application file for complete search history.

(56) References Cited

U.S. PATENT DOCUMENTS

| 10,341,304 | B1* | 7/2019 | Boutros | ................ | H04W 12/06 |
| 11,076,262 | B2* | 7/2021 | Vanderveen | .......... | H04W 12/80 |
| 2017/0132477 | A1 | 5/2017 | Kim et al. | | |
| 2018/0027600 | A1 | 1/2018 | Lawlis et al. | | |
| 2019/0132709 | A1* | 5/2019 | Graefe | ................ | G08G 1/0133 |

(Continued)

OTHER PUBLICATIONS

Extended European Search Report received for European Patent Application No. 19184401.8, dated Dec. 12, 2019, 10 pages.

(Continued)

*Primary Examiner* — Duc C Ho
(74) *Attorney, Agent, or Firm* — Fiala & Weaver P.L.L.C.

(57) ABSTRACT

A method in a network having a plurality of network nodes comprises the following steps performed in a first node of the network: receiving an initiation message from a second node of the network, the received initiation message comprising a public key of the second node; determining at least one of a proximity or velocity measure of the second node; checking whether the at least one determined measure is below a threshold and, when so, emitting a reply message comprising an encrypted part and an encryption key encrypted with the received public key from the second node; and repeatedly emitting status messages, wherein at least a part of each emitted status message is encrypted with the encryption key.

21 Claims, 3 Drawing Sheets

(56) References Cited

U.S. PATENT DOCUMENTS

2019/0245647 A1* 8/2019 Alieiev .................. G08G 1/093

OTHER PUBLICATIONS

Bouabdellah, et al., "A Secure Cooperative Transmission Model in VANET Using Attribute Based Encryption", International Conference on Advanced Communication Systems and Information Security (ACOSIS), IEEE, 2016, 6 pages.

Menezes, et al., "Chapter 1: Overview of Cryptography", Handbook of Applied Cryptography, XP001525001, CRC Press, 1996, 49 pages.

* cited by examiner (State of the Art)

METHOD FOR ENCRYPTED COMMUNICATION IN AN AD-HOC NETWORK

CROSS-REFERENCE TO RELATED APPLICATION(S)

This application claims priority to European Patent Application No. 19 184 401.8, filed on Jul. 4, 2019, the entirety of which is incorporated by reference herein.

BACKGROUND

Technical Field

The present disclosed subject matter relates to a method for encrypted communication in an ad-hoc network comprising a plurality of network nodes. The disclosed subject matter further relates to a node for an ad-hoc network in which encrypted communication is performed and an ad-hoc network comprising a first and a second node.

Background Art

In modern vehicle telecommunication, vehicles carry onboard units that periodically emit messages containing various data such as position of the vehicle, speed of the vehicle, and status of the vehicle. Onboard units of other vehicles can receive those messages to determine the state of traffic around them. Ideally, the onboard unit receiving such messages can determine traffic jams or accidents ahead of time and effect the vehicle to react to those circumstances. To exchange messages, the onboard units each act as an independent node and form an ad-hoc network when communicating with each other.

Newer applications such as Cooperative Awareness Messages (CAM) or Decentralised Event Notification Messages (DENM) allow the onboard unit to broadcast real-time status updates and event messages, respectively, while Cooperative Adaptive Cruise Control (CACC) enables the vehicle to be part of a caravan ("platooning"), in which multiple vehicles, typically lorries, travel together over a long stretch of road at approximately the same speed. To this end, the onboard units have to communicate according to a special protocol. Cooperative Awareness Messages and Decentralised Environmental Notification Messages are defined in ETSI (European Telecommunications Standards Institute) EN 302 637-2, while Cooperative Adaptive Cruise Control is defined in ETSI TR 103 299.

The messages are usually not encrypted because all vehicles in the vicinity of the onboard unit (node) should be able to receive and read those messages. However, due to the nature of the information that has to be shared, privacy of the vehicles is endangered. In the past this was solved by issuing authorisation tickets, which are issued by an independent authorisation authority and serve to pseudo-anonymise the onboard unit/node. To this end, an enrolment authority registers and enrols all the participating vehicles and communicates to the authorisation authority for which vehicles authorisation tickets are to be issued. These authorisation tickets are then included in each of the messages emitted by the onboard unit instead of an actual identity, e.g., as a signature.

In the past, it was necessary to renew the authorization tickets periodically such that vehicles cannot be tracked. To overcome this, it has been proposed in ETSI TR 103 299 to encrypt parts of the messages. The exchange of encryption keys is then performed by a Service Announcement Message (SAM) and replies thereto, which is also referred to as a "handshake". The problem with this method is that the handshake takes up time and network resources and in some applications there is not even a service provider that supports Service Announcement Messages.

BRIEF SUMMARY

It is therefore an aim of the disclosed subject matter to provide an improved method for encrypted communication in an ad-hoc network.

In a first aspect of the disclosed subject matter, a method is provided in which the following steps are performed in a first node of the network:

receiving an initiation message from a second node of the network, the received initiation message comprising a public key of said second node, the public key being a part of an asymmetric encryption scheme such that only the second node can decrypt messages encrypted with said public key of the second node;

determining at least one of a proximity or velocity measure of said second node in relation to the first node;

checking whether the at least one determined measure is below a threshold;

if the at least one determined measure is below the threshold, emitting a reply message comprising an encrypted part and an encryption key encrypted with the received public key from said second node; and repeatedly emitting status messages, wherein at least a part of each emitted status message is encrypted with the encryption key.

By means of this method, there is no need for separate Service Announcement Messages because the corresponding handshake is replaced with a trust-based system, in which a determined proximity or velocity serves as a measured trust parameter of the other node. Thereby, nodes are excluded from encrypted communication if they are too far away from the vehicle or will not be in the node's vicinity for too long due to differing velocities of the vehicles.

If the second node is deemed to be a trusted node, the encryption key is encrypted with the public key of the now trusted node and attached to a regular status message or at least an encrypted container. This method takes up nearly no additional bandwidth and effectively excludes unwanted communication partners such as vehicles travelling in opposite directions or roadside beacons tapping communications on the road. Ultimately, exhaustive handshake procedures to gain admission to the encrypted communication in the ad-hoc network are abolished.

Optionally, the first node is an onboard unit carried by a travelling vehicle. The disclosed method is especially suited for vehicles as replacing the Service Announcement Messages by a threshold comparison of a proximity or velocity measure is suited for nodes travelling in close proximity in approximately the same direction. Alternatively, the method could also be employed in other ad-hoc network applications in which encrypted is performed, for example in drone communications or the like.

Further, the initiation message and the status message may have the same format and the reply message have the same format as the status message with an additional concatenated container comprising the encryption key. By means of this, all messages emitted in the ad-hoc network usually have the same standard format and the reply message is a message according to the standard format with an additional container. By means of this, a homogenous network can be achieved, in which only one type of message is communicated, and especially no handshake communications are necessary. Further advantageously, the first node can already repeatedly emit status messages before receiving the initiation message from the second node. In this case, the first node can simply broadcast the reply message in place of one of the status messages. To a third node this then looks like the first node just continued to repeatedly emit status messages.

Further, the initiation and status messages may comprise Cooperative Awareness Messages, CAM, in particular as defined in the standard ETSI EN 302 637-2. Applications for CAMs are, e.g., emergency vehicle warnings, slow vehicle indications, intersection collision warnings, and motorcycle approaching indications. Using CAMs has the advantage that well-established systems are already present on the market and are predominantly used in vehicular networks.

Alternatively or additionally, the initiation and status messages comprise Decentralized Environmental Notification Messages, DENM, in particular as defined in the standard ETSI EN 302 637-2. Such DENMs are usually emitted in case of an accident or the like. Just like CAMs, the use of DENMs is already widely spread in the art such that the present method can easily be implemented in existing applications.

Optionally the CAMs and DENMs are located in an unencrypted part of the initiation and status messages because CAMs and DENMs usually comprise a GNSS (Global Navigation Satellite System) fix that has been established by the respective node as well as a velocity indication, which is commonly also determined by the device generating the GNSS fix. This has the advantage that the proximity or velocity measure can be directly read out from the initiation message. In some applications, however, privacy concerns are more important such that also the CAMs and DENMs can be encrypted.

Further, the encrypted part of the emitted reply and status messages may comprise Cooperative Adaptive Cruise Control, CACC, messages. As CACC messages usually comprise privacy-sensitive data, message parts according to these protocols are to be encrypted to ensure privacy. The use of the disclosed method in conjunction with CACC is especially advantageous because the proximity or velocity measure gives information about nearby platooning vehicles, with which usually CACC messages are exchanged.

The determination of proximity and/or velocity measures, which are indicative of the trust given to a certain node, can be made in a plurality of ways. All of the following methods can be combined to obtain measures that are more precise (for example by averaging proximity measures that are obtained in different ways) or to verify the determined measures (for example by checking whether a usually more precise proximity measure lies within a precision range of a less precise proximity measure). Additionally, if a proximity measure as well as a velocity measure are determined, two threshold comparisons can be performed, one for the proximity measure and one for the velocity measure.

In a first variant, the proximity measure is determined by means of measuring the signal strength of the received initiation message. Measuring the signal strength is usually dependent on whether the node/onboard unit supports a measurement of the signal strength and on the means of communication. As communications in vehicular ad-hoc networks (VANETs) are usually performed over WLAN, the signal strength of a received message can be measured with the RSSI (Received Signal Strength Indication) means in a conventional WLAN receiver circuitry.

In a second variant, the proximity measure is determined by means of reading a positional information from an unencrypted part of the received initiation message. This is especially suited if the message comprises a CAM or DENM, in which usually a current GNSS fix is included.

In a third variant, the velocity measure is determined by means of calculating a difference of proximity measures determined from two received initiation messages. In this case, the proximity measures used for determining the velocity measure can be either directly measured by means of the signal strength or read out from a received message as above.

In a fourth variant, the velocity measure is determined by means of reading a velocity information from an unencrypted part of the received initiation message. Vehicle speed is also an information usually included in a CAM or DENM.

Additionally to proximity or velocity measures, other measures can be included to determine if the second node is trustworthy. For example, the reply message comprising the encryption key is only emitted if it can be determined from the received initiation message that the second node supports a predetermined standard. This is useful because the encryption key should only be handed to vehicles that reply with the same standard and thus share the same privacy information.

The encryption key can be initialised in the first node in a number of ways. In one embodiment, the first node itself generates the encryption key before emitting said reply message comprising the encrypted part. This is a situation in which either the node opens up a session with an encryption key for the first time or in which the encryption key is only to be shared with the second node and no other node.

Alternatively, the encryption key is received from another node performing the method in the embodiments of above. This is the case in which previously another node has opened up a session with this encryption key and shared the encryption key with the first node, which then adds the second node to its session. This has the advantage that multiple nodes can use the same encryption key, i.e., there can be one encryption key for a whole platooning group of vehicles.

In a second aspect of the present disclosed subject matter, there is provided a node for an ad-hoc network in which encrypted communication is performed, the node being configured to perform the method in the embodiments of above. This node has the same advantages as the method described above.

In another aspect of the disclosed subject matter, there is provided an ad-hoc network comprising a first node and a second node, each configured to perform the method in the embodiments of above, and wherein the one of the nodes that first receives the initiation message comprising the public key of the other node is configured to initiate said method. In this ad-hoc network, a plurality of nodes each perform the disclosed method, but only the node that first receives an initiation message (which is usually a status message) performs the disclosed method. In the scenario with the first and the second node, the second node receives the encryption key but does not itself share an encryption key with the first node. This has the advantage that the method can be performed more efficiently. Furthermore, it prevents the first and the second node to mutually exchange encryption keys, i.e., to use two different encryption keys when communicating. Additionally, even a merging of two platooning caravans is supported as the encryption key of one caravan can be replaced with the encryption key of the other caravan.

BRIEF DESCRIPTION OF THE DRAWINGS/FIGURES

The disclosed subject matter shall now be explained in more detail below on the basis of exemplary embodiments thereof with reference to the accompanying drawings, in which.

DETAILED DESCRIPTION

Figure 1:
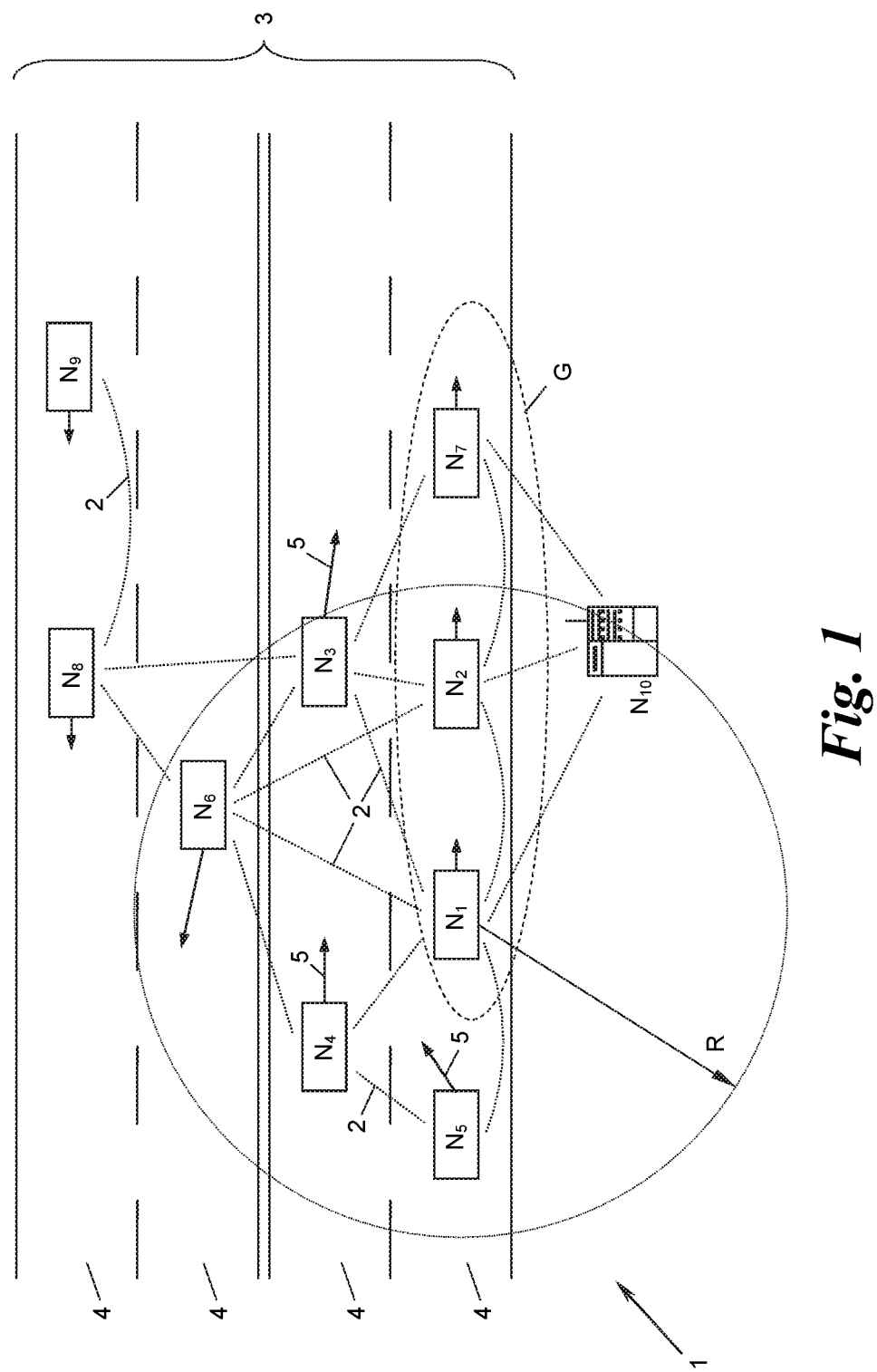
FIG. 1 shows a schematic top view of a road, on which a plurality of vehicles carrying onboard units (nodes) travel.

FIG. 1 shows an ad-hoc network 1 with a plurality of network nodes $N_1, N_2, \ldots$, generally which communicate via radio-frequency communications 2 with each other. In the shown example, the nodes $N_i$ are embodied as onboard units carried by travelling vehicles (nodes $N_1$-$N_9$) and by a roadside communication terminal (node $N_{10}$). The shown ad-hoc network 1 could, however, also be used for other applications, for example in which the nodes $N_i$ are telecommunication terminals carried by ships, drones, or humans.

The vehicles carrying nodes $N_i$ travel on a roadway 3 with four lanes 4, on which the vehicles or network nodes $N_1$-$N_9$, respectively, each travel with a velocity in a certain direction, as is indicated by velocity vectors 5. In the shown example, the network node $N_{10}$ is stationary. According to the spirit of the ad-hoc network 1, the radio-frequency-communications 2 are formed dynamically when a network node $N_i$ is in a communication range R with a respective other node $N_j$ (j≠i). In the present example, communications 2 are performed via WLAN, for example according to standard IEEE 802.11x. Other communication types, in particular short-range communications, can be employed too, for example via Near Field Communication (NFC) or Dedicated Short-Range Communication (DSRC). Ad-hoc networks 1 of these types are known under different names such as vehicular ad-hoc networks (VANETs), car-to-car communications (car2car, C2C), vehicle-to-vehicle communications (V2V), or vehicle-to-infrastructure communications (V2X).

As can be seen from FIG. 1, the nodes $N_1$, $N_2$, and $N_7$ have approximately the same velocity vector 5 and can thus be considered to be "platooning" together in a group G, i.e., travel in a caravan for an extended amount of time. Such platooning vehicles should exchange data with each other that is different to data that is exchanged with passing vehicles (e.g., nodes $N_3$, $N_4$). The additional exchanged data serves to keep the nodes $N_1$, $N_2$, $N_7$ in the group G at a constant speed, for example. However, due to privacy concerns, this additional data should not be accessible to all listening nodes $N_i$ such that this data is to be encrypted.

Figure 2A:
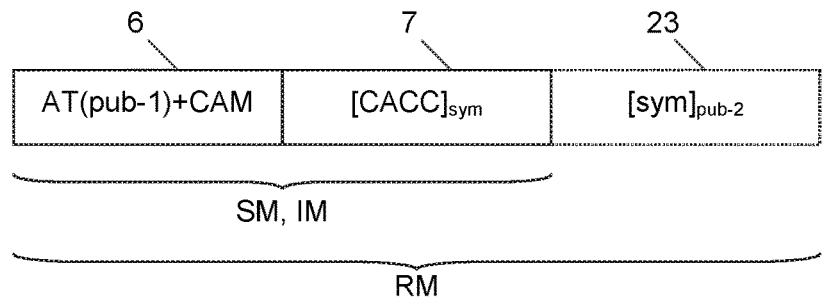
FIG. 2a shows a first variant of the format of a status message, initiation message, and reply message, respectively.
Figure 2B:
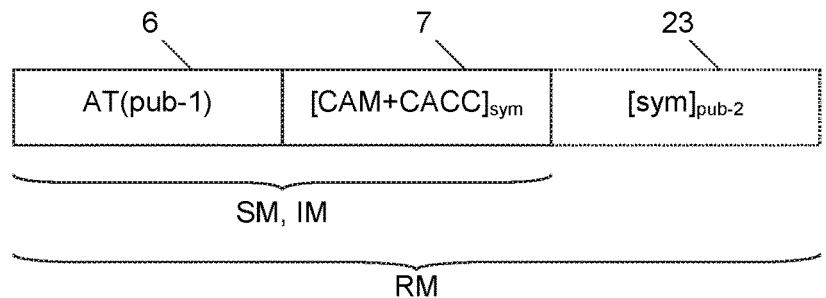
FIG. 2b shows a second variant of the format of a status message, initiation message, and reply message, respectively.

FIGS. 2a and 2b show the format of "regular" messages emitted by the nodes $N_i$ in the ad-hoc network 1, hereinafter called status messages SM.

In the embodiment of FIG. 2a, the status message SM comprises an unencrypted part 6 and a part 7 encrypted with an encryption key sym. The unencrypted part 6 here comprises an authorisation ticket (AT) as well as a Cooperative Awareness Message (CAM) or a Dedicated Environmental Notification Message (DENM). In more general embodiments, the unencrypted part 6 does not even have to be present in the status message SM at all.

The authorisation ticket AT is issued by an authorisation authority (AA) and comprises, for example, an "anonymised identity" of the vehicle carrying the node $N_i$. Furthermore, the AT comprises a public key pub-i of a node $N_i$. The public key pub-i is a part of an asymmetric encryption scheme such that only the respective node $N_i$ can decrypt messages encrypted with said public key pub-i of the node which is done by means of a private key priv-i. Such asymmetric encryption scheme may be, e.g., based on the standard IEEE 1609.2 or ETSI TS 103 097. It should be highlighted that the notion of the AT is just one embodiment and the unencrypted part 6 could have any other format and content, e.g., comprise only the public key pub-i.

The CAMs and DENMs are defined in ETSI EN 302 637-2 and usually comprise data of the vehicle, especially a current GNSS (Global Navigation Satellite System) fix of the vehicle carrying the node $N_i$ and a current velocity derived from such GNSS fixes.

The encrypted part 7 comprises sensitive subject matter, for example an identity of the vehicle carrying the node $N_i$ such as a license plate number, a corporate affiliation, or the like. For example, the encrypted part 7 can comprise a Cooperative Adaptive Cruise Control (CACC) message as defined in ETSI TR 103 299.

The encryption key sym, with which the part 7 is encrypted, is a symmetric Advanced Encryption Standard (AES) key, but can also be any other encryption key known in the art, e.g., an RSA or ECIES key. Symmetric keys have the advantage that they can be used for encryption as well as decryption of a file encrypted with the same symmetric key.

FIG. 2b shows a different format of the status message SM. Again, the Authorisation Ticket AT is present in the unencrypted part 6, but here the encrypted part 7 comprises the CAM or DENM in addition to the CACC message. It is, however, also entirely feasible that the encrypted part 7 only contains one of a CAM, DENM, CACC message, or other private data.

Figure 3:
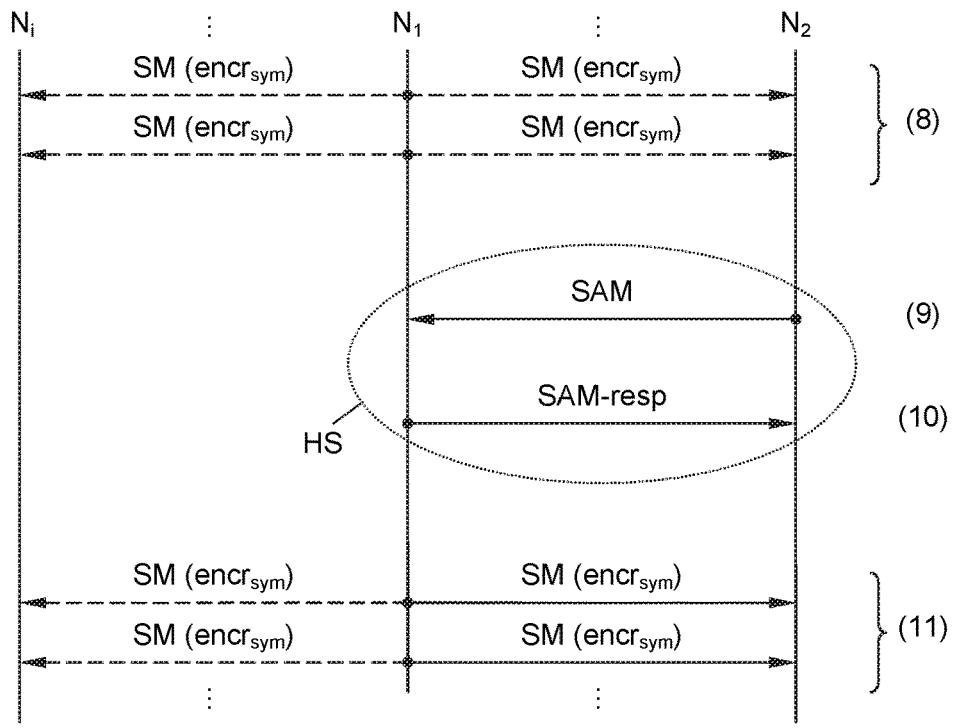
FIG. 3 shows a method for encrypted communication according to the state of the art in a sequence diagram.

FIG. 3 shows a flow of messages according to the state of the art between a first node $N_1$, a second node $N_2$, and an arbitrary node $N_i$. In the beginning (step 8), the first node $N_1$ broadcasts status messages SM as described above for FIGS. 2a and 2b. These messages are received by the second node $N_2$ and any other node which at this point do not know the encryption key sym, for which reason the communication path is depicted with a dashed line. Alternatively, one or more of the other nodes $N_i$ could already possess the encryption key sym and decrypt the encrypted part 7, as explained further below.

Because the second node $N_2$ is interested in the content of the encrypted part 7, it sends a service announcement SAM to the first node $N_1$ (step 9), which it has identified by means of the content of the unencrypted part 6 of the status message SM. The first node $N_1$ receives the service announcement message SAM and evaluates the service announcement message SAM by checking whether the second node $N_2$ is authorised for communication, for example if a valid authorization can be found in the service announcement message SAM. If this is the case, the first node $N_1$ replies with a response SAM-resp to the service announcement message SAM (step 10). This response SAM-resp may contain the encryption key sym or a link thereto such that the second node $N_2$ can decrypt each container encrypted with the encryption key sym in the following communications. This service announcement message SAM together with the response resp-SAM thereto is called a handshake HS and serves to register the second node $N_2$ with the first node $N_1$.

Thereafter (step 11), the first node $N_1$ continues to broadcast status messages SM having an unencrypted part 6 and an encrypted part 7, which can now be decrypted by the second node $N_2$ as it is in possession of the encryption key sym (hence the solid line for the bottom right communications in FIG. 3). The other nodes not having received the encryption key sym from the first node $N_1$, still cannot decrypt the encrypted part 7 and are thus excluded from this part of the communication (hence the dashed lines for the bottom left communications in FIG. 3).

Figure 4:
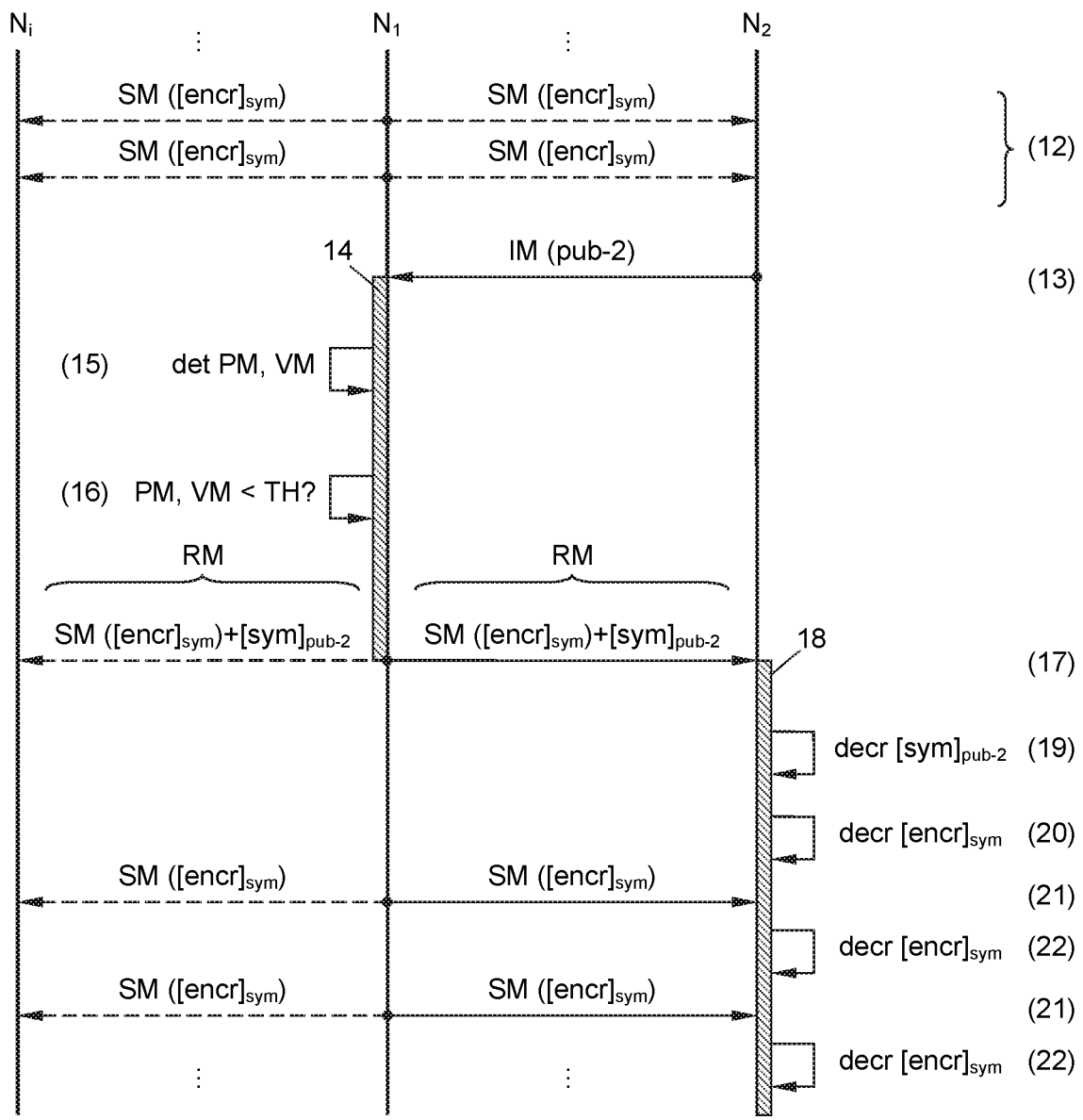
FIG. 4 shows the method of the present disclosure for encrypted communication in a sequence diagram.

FIG. 4 shows the flow of messages according to the disclosed subject matter between a first node $N_1$, a second node $N_2$, and an arbitrary node $N_i$. In the beginning (step 12), again the first node $N_1$ repeatedly emits status messages SM according to FIG. 2a or 2b. However, this is not mandatory as the first node $N_1$ could also only start emitting status messages SM after having received an initiation message IM from the second node $N_2$, as will be explained later on.

At some point the second node $N_2$ itself emits a message (step 13), hereinafter called initiation message IM, may it be in response to receiving a status message SM from the first node $N_1$ or due to an independent event at the second node $N_2$. The initiation message IM comprises at least a public key pub-2 of the second node $N_2$. As mentioned above for the public key pub-1 of the first node $N_1$, the public key pub-2 of the second node $N_2$ is part of an asymmetric encryption scheme such that only the second node $N_2$ can encrypt messages encrypted with the public key pub-2 of the second node $N_2$, which is done by means of a private key priv-2 of the second node $N_2$. Again, this asymmetric encryption scheme may be, e.g., based on the standard IEEE 1609.2 or ETSI TS 103 097.

Upon receiving the initiation message IM, the first node $N_1$ determines in a process 14 at least one of a proximity measure PM and a velocity measure VM of said second node $N_2$ in relation to the first node $N_1$ (step 15). The proximity measure PM is a measure of how far the second node $N_2$ is located away from the first node $N_1$. This can be achieved in a couple of ways, two of which will be detailed in the following.

Firstly, the signal strength (RSSI, Received Signal Strength Indication) of the received initiation message IM can be measured. The received signal strength is a direct measure of the distance of the second node $N_2$ to the first node $N_1$. Measurement is usually performed directly by a transceiver of the node $N_1$.

Secondly, a positional information can be read out from an unencrypted part 6 of the received initiation message IM. If the Common Awareness Message CAM is in the unencrypted part 6 of the initiation message IM, a GNSS fix stored therein can be used as the positional information. In this case, the proximity measure PM can be determined by calculating the difference of an own GNSS fix of the first node $N_1$ and the read-out positional information of the second node $N_2$.

If the proximity measure PM is determined in more than one way, a plurality of proximity measures PM can be used to calculate a more accurate proximity measure PM (e.g., by averaging) or to verify one thereof.

The velocity measure VM can also be determined in a number of ways, three of which will be detailed in the following.

Firstly, a difference of proximity measures PM determined from two received initiation messages IM can be calculated. Together with a time difference between reception of said initiation messages IM, the velocity measure VM can be determined therefrom.

Secondly, the received signal strength RSS of initiation messages IM can be determined and thereafter the velocity measure VM is determined therefrom.

Thirdly, the velocity measure VM can be determined by reading a velocity information from the unencrypted part 6 of the received initiation message IM. For example, if the Common Awareness Message CAM is not encrypted, the velocity measure VM can be read out therefrom.

The velocity measure VM may be either in terms of a scalar indicating the speed of the node $N_2$ or in terms of a vector indicating the speed and heading of the node $N_2$. The indication of speed and optionally heading may be given either absolutely or relatively to the node $N_1$.

Again, velocity measures VM determined in different ways can be used to calculate a more accurate velocity measure VM or to verify one thereof.

In addition to determining the proximity and/or velocity measures PM, VM, other factors can be considered, too. For example, as an additional factor it can be determined whether a node $N_i$ supports a certain standard or not. To this end, in the unencrypted part 6 of the initiation message IM there can be an indication of the standards supported by the respective node $N_i$.

As has been outlined above, in many cases only specific types of messages are encrypted, for example CAM or CACC. If it is determined that the second node $N_2$ does not support any of those standards, the second node $N_2$ is not considered trustworthy for two reasons: Firstly, the second node $N_2$ is unwilling to share the same information with the first node $N_1$ and secondly it could mean that the second node $N_2$ had not been authorised by a third party to use said standard.

Determining the proximity and/or velocity measure PM, VM serves to determine whether the second node $N_2$ is trustworthy without actually receiving a service announcement message SAM. Returning to the example of FIG. 1, it can be seen that the velocity vectors 5 of the first node $N_1$, the second node $N_2$, and the seventh node $N_7$ are approximately the same. Therefore, it can be assumed that these nodes $N_1$, $N_2$, and $N_7$ are all part of a group G, i.e., they are "platooning". Therefore, these nodes $N_1$, $N_2$, and $N_7$ should trust each other to exchange CACC messages.

From the viewpoint of the first node $N_1$, the nodes $N_2$, $N_4$, $N_5$, $N_6$ and $N_{10}$ are in a communication distance with the first node $N_1$. However, for the first node $N_1$ only the second node $N_2$ should be classified as a trusted communication partner since the other nodes are either too far away ($N_8$, $N_9$) or have different velocities ($N_3$, $N_4$, $N_5$, $N_6$, $N_8$, $N_9$, $N_{10}$), such that they are not platooning together. On the other hand, while node $N_7$ could be trusted because of the same velocity, it is outside of the communication range R of the first node $N_1$.

To analytically determine which node $N_i$ the first node $N_1$ should trust, the first node $N_1$ checks whether the determined measure/s PM and/or VM is/are below a threshold TH (step 16). This threshold TH can be pre-set to a predetermined value to set the "range of trust". The threshold TH can also be application specific, e.g., for CACC applications the proximity measure PM should be in a predetermined range and the velocity measure VM (its absolute value in case of a vectorial VM) should be zero or close to zero. For collision avoidance applications the proximity measure PM should be in a predetermined range and the velocity measure VM should be "negative", i.e., should indicate that the nodes $N_1$ and $N_2$ are moving towards each other with a speed of approach exceeding a predetermined critical value.

If the velocity measure VM is a vector, the threshold TM may be a scalar compared to the length of that vector. Alternatively, if the velocity measure VM is a vector, the threshold VM can also take into account the angle of divergence of the heading of the node $N_2$ from the heading of the node $N_1$.

If the determined measure/s PM and/or VM is/are below the threshold TH, i.e., the node $N_2$ is trusted, the first node $N_1$ emits a reply message RM comprising at least the encrypted part 7 and the encryption key sym encrypted with the received public key pub-2 from said second node $N_2$ (step 17). This serves two purposes: Firstly, in a process 18 the second node $N_2$ can now retrieve the encryption key sym by applying its private key priv-2 onto the encryption key encrypted with the public key pub-2, such that it possesses the encryption key sym (step 19). Thereafter, the second node $N_2$ can retrieve the content of the encrypted part 7 of the reply message RM (step 20). Secondly, all other nodes $N_i$ receiving the reply message RM can decrypt the container 7 if they already have the encryption key sym. Other nodes $N_i$ that do not have the encryption key sym can only access the unencrypted part 6 of the reply message RM.

From now on (steps 21), the first node $N_1$ repeatedly emits status messages SM, of which at least a part is encrypted with the encryption key sym. As the second node $N_2$ is now in possession of the encryption key sym, it can decrypt each encrypted part 7 of a received status message SM (steps 22).

In theory, initiation message IM, reply message RM and status message SM can have different formats, for example the initiation message IM could only comprise a public key pub-2, the reply message RM could only comprise the encrypted part 7 and the encryption key encrypted with the public key pub-2 from the second node $N_2$, and the status messages SM could only comprise the encrypted part 7. Usually, however, all communications 2 in the ad-hoc network 1 are of the approximately same format, meaning the initiation message IM and the status message SM have the same format, for example have an unencrypted part 6 and an encrypted part 7 as shown in FIGS. 2a, 2b. The reply message RM also has the same format as the status message SM but with an additional concatenated container 23 comprising the encryption key sym (see also FIGS. 2a and 2b). This ensures that each message sent within the ad-hoc message 1 comprises at least an unencrypted part 6 and an encrypted part 7 to achieve uniform communication.

Depending on whether the second node $N_2$ is the initial node that starts communication with the first node $N_1$, the first node $N_1$ may already repeatedly emit status messages SM or not (step 12). As status messages SM are usually emitted at a certain rate, the reply message RM can be just one of those status messages SM but with the additional container 23 comprising the encryption key sym. Thereby, the periodicity of status messages SM is not interrupted (one of the status messages SM being the reply message RM).

The encryption key sym can be generated by the first node $N_1$ itself or the first node $N_1$ can receive the encryption key sym from another node $N_i$. If the first node $N_1$ generates the encryption key sym itself, this is usually done when the second node $N_2$ is the first trusted node that seeks communication with the first node $N_1$. In this case, the encryption key sym is generated usually directly before emitting said reply message RM comprising the encrypted part 7. If the first node $N_1$ has, on the other hand, received the encryption key from another node this means that the first node $N_1$ and the other node $N_i$ are already platooning together and "add" the second node $N_2$ for platooning. This can be important in cases in which the second node $N_2$ and the other node $N_i$ are too far apart to directly communicate but are still part of the same trusted group G, as can be seen in FIG. 1 for the nodes $N_1$ and $N_7$.

In case both the first node $N_1$ and the second node $N_2$ support the method described above for FIG. 4, the one of the nodes $N_1$, $N_2$ that first receives the initiation message IM comprising the public key pub-1, pub-2 of the other node $N_1$, $N_2$ is configured to initiate the method by determining the proximity measure PM and/or velocity measure VM and so forth to avoid two encryption keys sym being used in parallel. By means of this, also two groups G of platooning vehicles can be merged.

CONCLUSION

The disclosed subject matter is not restricted to the specific embodiments described in detail herein, but encompasses all variants, combinations, and modifications thereof that fall within the framework of the appended claims.

What is claimed is:

1. A method for encrypted communication in an ad-hoc network having a plurality of network nodes, comprising the following steps performed in a first node of the network:
   receiving an initiation message from a second node of the network, the received initiation message comprising a public key of said second node, the public key being a part of an asymmetric encryption scheme such that only the second node can decrypt messages encrypted with said public key of the second node;
   determining at least one of a proximity or velocity measure of said second node in relation to the first node;
   checking whether the at least one determined measure is below a threshold;
   when the at least one determined measure is below the threshold, emitting a reply message comprising an encrypted part and an encryption key encrypted with the received public key from said second node; and
   repeatedly emitting status messages, wherein at least a part of each emitted status message is encrypted with the encryption key.

2. The method according to claim 1, wherein the first node is an onboard unit carried by a travelling vehicle.

3. The method according to claim 1, wherein the initiation message and the status message have the same format and the reply message has the same format as the status message with an additional concatenated container comprising the encryption key.

4. The method according to claim 1, wherein the initiation and status messages comprise Cooperative Awareness Messages, CAM, as defined in the standard ETSI EN 302 637.

5. The method according to claim 1, wherein the initiation and status messages comprise Decentralized Environmental Notification Messages, DENM, as defined in the standard ETSI EN 302 637.

6. The method according to claim 1, wherein the encrypted part of the emitted reply and status messages comprise Cooperative Awareness, CA, or Cooperative Adaptive Cruise Control, CACC, messages.

7. The method according to claim 1, wherein the proximity measure is determined by means of measuring the signal strength of the received initiation message.

8. The method according to claim 1, wherein the proximity measure is determined by means of reading a positional information from an unencrypted part of the received initiation message.

9. The method according to claim 1, wherein the velocity measure is determined by means of calculating a difference of proximity measures determined from two received initiation messages.

10. The method according to claim 1, wherein the velocity measure is determined by means of reading a velocity information from an unencrypted part of the received initiation message.

11. The method according to claim 1, wherein the reply message comprising the encryption key is only emitted if it can be determined from the received initiation message that the second node supports a predetermined standard.

12. The method according to claim 1, wherein the encryption key is generated before emitting said reply message comprising the encrypted part.

13. The method according to claim 1, wherein the encryption key is received from another node.

14. A node for an ad-hoc network in which encrypted communication is performed, which node is configured to perform the method according to claim 1.

15. The node according to claim 14, which node is configured to perform the method according to claim 4.

16. The node according to claim 14, which node is configured to perform the method according to claim 5.

17. The node according to claim 14, which node is configured to perform the method according to claim 7.

18. The node according to claim 14, which node is configured to perform the method according to claim 8.

19. The node according to claim 14, which node is configured to perform the method according to claim 9.

20. The node according to claim 14, which node is configured to perform the method according to claim 10.

21. An ad-hoc network comprising a first node and a second node, each configured to perform the method according to claim 1, wherein that one of the nodes that first receives the initiation message comprising the public key of the other node is configured to initiate the method according to claim 1.

* * * * *